United States Patent [19]

Horak

[11] 4,284,210

[45] Aug. 18, 1981

[54] STATIC METERING PUMP

[76] Inventor: Vladimir Horak, 353 High St., Closter, N.J. 07624

[21] Appl. No.: 55,818

[22] Filed: Jul. 9, 1979

Related U.S. Application Data

[63] Continuation-in-part of Ser. No. 862,744, Dec. 21, 1977, abandoned.

[51] Int. Cl.³ .............................................. B67D 5/08
[52] U.S. Cl. ...................................... 222/14; 222/23; 222/51; 222/68
[58] Field of Search ....................... 222/14, 15, 21, 22, 222/23, 37, 51, 64, 67, 68

[56] References Cited

U.S. PATENT DOCUMENTS

| | | | |
|---|---|---|---|
| 3,194,434 | 7/1965 | Evanson | 222/67 X |
| 3,224,638 | 12/1965 | Harrell | 222/64 |
| 3,960,295 | 6/1976 | Horak | 222/21 X |

*Primary Examiner*—Joseph J. Rolla
*Attorney, Agent, or Firm*—Edward F. Levy

[57] ABSTRACT

A static metering pump includes a pair of tanks, electrically operated inlet and outlet valves, liquid level sensors and controls which permit the alternate filling of a first of the tanks while permitting the discharging of liquid from a second of the tanks and then permitting the discharging of liquid from the first tank while filling the second tank. The cycle of filling and discharging of the tanks is repeated until a preselected volume of liquid is dispensed with precise metering. The two tanks are adapted to dispense the same volume of liquid in normal operation. Where the total volume of dispensed liquid called for includes a fraction of the normal volume of the tanks, one of the tanks is provided with a fractional liquid level sensor which may be preset to fill this tank initially to the fractional volume and to commence the metering operation by the discharge of this tank.

10 Claims, 7 Drawing Figures

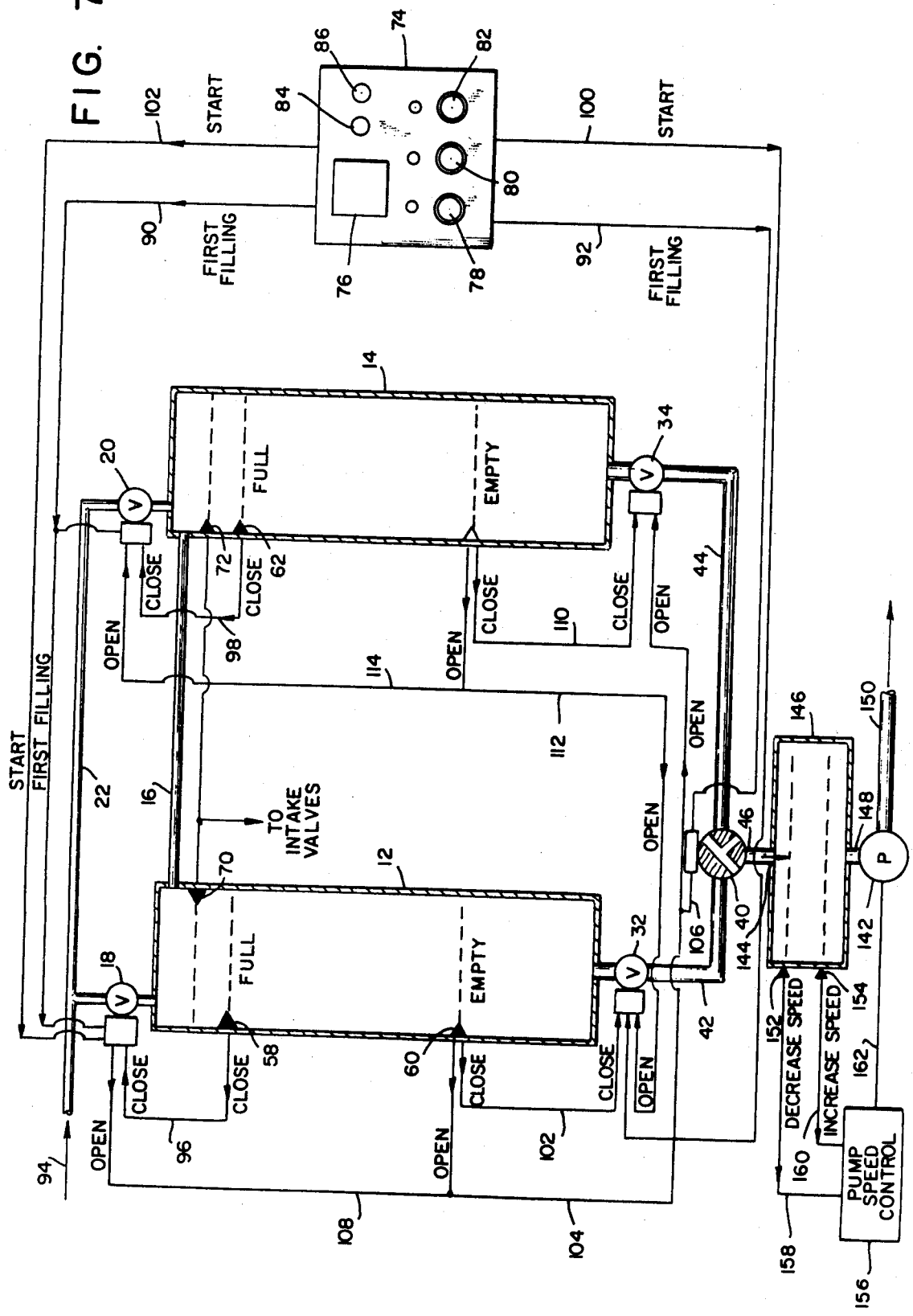

STATIC METERING PUMP

This application is a continuation-in-part of my co-pending U.S. patent application Ser. No. 862,744 filed Dec. 21, 1977 (now abandoned) and entitled "STATIC METERING PUMP".

The present invention relates generally to pumps and more particularly to a static metering pump for delivery of measured quantities of fluid.

The prior art relating to devices for the delivery of measured quantities of fluids includes numerous examples of positive displacement type pumps in which the displacement of the pump is known and is used to meter the quantity of fluid being pumped. Positive displacement pumps are subject to several inherent problems including: inaccuracy due to wear of component parts, inaccuracy due to fluctuations in operating speed caused by input power fluctuations, and inaccuracy due to leakage of the fluid past the pump seals. In addition to leakage problems causing metering inaccuracy, in applications involving the metering of hazardous fluids, leakage of the fluid or of fumes can result in significant safety problems which can affect the economical operation of the affected system. The seals of conventional high speed metering pumps are subject to a variety of failure modes which can cause the shut down of the pump. In critical applications, where an interruption of the metering function can result in a costly shut down of operations, it is usually necessary to have a stand-by pump in the event of a pump failure.

The displacement of a conventional positive displacement metering pump is usually relatively small when compared with the volume of fluid conventionally metered in a single dose. This results in a requirement for a relatively large number of cycles or revolutions of the pump in order to develop the volume of the dose. The inaccuracy present in a single cycle of a conventional pump is cumulative through the metering process and even if the inaccuracy present in a single cycle of such a pump is small, the use of such a pump over a large number of cycles results in an appreciable overall error in the volume of fluid delivered. An additional source of problems in the use of conventional pumps is the fact that the accuracy of such pumps deteriorates with use and these pumps must be recalibrated periodically.

Conventional metering pumps also cause pulsation in the output flow which is disadvantageous in certain applications.

Conventional metering pumps, in addition, are designed to operate with fluids which have a narrow range of viscosity. The same pump, for example, can not be used to meter glycerol and ethyl alcohol.

It is an object of the present invention to overcome the disadvantages of the prior art by providing a static metering pump, for the metering and dispensing of doses of liquids, which has no moving parts.

Another object of the present invention is to provide a static metering pump which is free of the problems normally associated with rotating seals found in conventional metering pumps.

Another object of the present invention is to provide a static metering pump which is capable of great accuracy.

Another object of the present invention is to provide a static metering pump in which the volume delivered during a single cycle of operation may be made relatively large when compared with the overall volume of the dose.

Another object of the present invention is to provide a static metering pump which is free of leakage of liquid or fumes.

Another object of the present invention is to provide a static metering pump which may be subjected to sterilizing heats without damage.

Another object of the present invention is to provide a static metering pump in which the output flow is free from pulsations, in contrast to the pulsating flow delivered by conventional metering pumps.

Another object of the present invention is to provide a static metering pump which may be easily adapted for operation with liquids of different viscosity.

Still another object of the present invention is to provide a static metering pump which comprises a relatively small number of relatively simple component parts which are economical of manufacture.

In accordance with the present invention there is provided a static metering pump comprising a pair of tanks connected by a tube which communicates between upper portions of the tanks. Each of the tanks has an electrically operated inlet valve and an electrically operated outlet valve. The two outlet valves communicate with an electrically-operated three-way valve which leads to a discharge tube. An inlet tube leads to the two inlet valves. An electrically-operated liquid level control system is provided which includes liquid level sensors on each of the tanks, a control panel and electrical connections between the control panel, the inlet valves, the outlet valves, the three-way valve and the liquid level sensors.

During the operation of the static metering pump, liquid alternately fills a first of the two tanks while being discharged from the second tank and then when the liquid falls below a preselected level in the first tank, the inlet valves, outlet valves and the three-way valve are automatically reset to discharge liquid from the first tank while filling the second tank. The above cycle of filling and discharging of the tanks proceeds automatically until a preselected number of cycles is completed, at which time a preselected volume of liquid has been metered and the static metering pump is shut off. If the volume to be dispensed constitutes a fraction of the full capacity of the tanks, a fractional sensor is provided to partially fill one of the tanks to the fractional value, and commence the metering operation with this tank.

In accordance with the invention, the flow of the liquid from the static metering pump may be due to gravity alone or alternatively, air or gas above the level of the liquid in the tanks may be pressurized using an external source of pressure. The liquid itself may be pressurized using an external pressure pump.

In an alternative embodiment of the invention, which is capable of discharging liquid under high pressure, the outlet tube is connected to a third tank which includes a pair of adjustably mounted electrically-operated liquid level sensors. The outlet of the third tank is connected to a high pressure pump. The high pressure pump and the liquid level sensors are connected via electrical connections to an electrically-operated pump speed control. During operation of this alternative embodiment, when the level of the liquid in the third tank rises above the liquid level sensor, designated as the high level sensor, the pump speed control increases the speed of the high pressure pump. When the level of the liquid falls below the liquid level sensor, designated as the low level sensor, the pump speed control decreases the speed of the high pressure pump. The pump speed control can thus compensate for variations in the speed of the pump which are caused by variations in the input power which is provided for operation of the high pressure pump. Because the high pressures are generated by the pressure pump, this embodiment has the advantage of being able to provide a metered flow of liquid under high pressure even though the tanks of the static metering pump are constructed to withstand relatively low pressures.

Additional objects and advantages of the invention will become apparent during the course of the following specification when taken in connection with the accompanying drawings, in which:

FIG. 7 is a schematic functional diagram of the embodiment of the static pump shown in FIG. 6.

Figure 1:
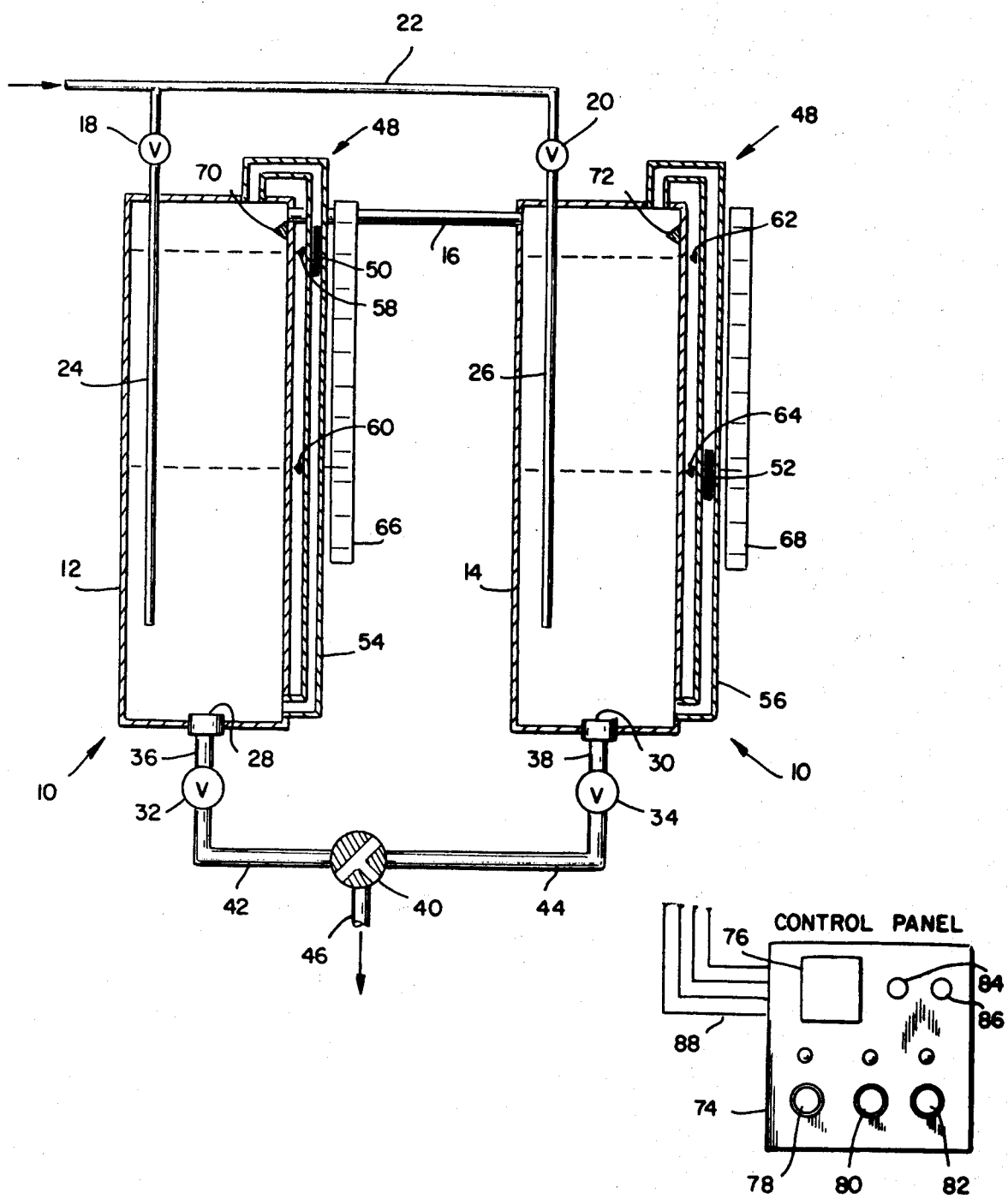
FIG. 1 is a schematic side elevational view of a static pump according to the present invention, showing a pair of connected tanks, associated valves and sensors, and a control panel.

Referring in detail to the drawings, there is shown in FIG. 1 a static metering pump 10 according to the present invention. The static metering pump 10 includes a pair of tanks 12, 14 which are connected by a tube 16, so that air or other gas can flow from one tank to the other. The static metering pump 10 also includes a pair of electrically operated intake valves 18, 20 which are fed via an intake tube 22. The intake valves 18, 20 are connected to tubes 24, 26, which terminate in the lower portions of tanks 12, 14, respectively, thereby minimizing the creation of turbulence during the filling of the tanks 12, 14.

The tanks 12, 14 each include a replaceable orifice member 28, 30 which may be replaced by pairs of different orifice members of similar construction having openings of various sizes, thereby enabling the static metering pump 10 to meter liquids of differing viscosity.

The orifice members 28, 30 lead to a pair of electrically-operated outlet valves 32, 34 via tubes 36, 38. The outlet valves 32, 34 are connected to an electrically-operated three-way valve 40 via tubes 42, 44. The three-way valve 40 discharges the metered liquid via a tube 46.

Each of the tanks 12, 14 includes an electrically-operated liquid level control device of a known type. A liquid level control device 48 which has been found appropriate is described in U.S. Pat. No. 3,703,246, entitled "Liquid Level Control", and will be described to the extent required to explain the construction of the present invention. The liquid level control device 48 for each of the tanks 12, 14 are identical, and each device 48 includes a magnetic float member 50, 52 consisting of a disc magnet (not shown) molded within a buoyant plastic capsule. Each magnetic float member 50, 52 rests on the surface of the liquid present in respective vertical tubes 54, 56 which are connected to the tanks 12, 14 both at the top and at the bottom of the latter. Positioned outside of each of the vertical tubes 54, 56 are a respective pair of reed switches 58, 60 and 62, 64 which may be mounted on sliders (not shown) to permit adjustment of the position of the reed switches 58, 60, 62, 64 in a vertical direction. When one of the magnets mounted on one of the float members 50, 52 passes a reed switch 58, 60, 62, 64, the magnet actuates the reed switch, thereby closing an electrical circuit. The liquid level control devices 48 are connected to the intake valves 18, 20 and the outlet valves 32, 34 via electrical connections for the purpose of actuating these valves to maintain desired levels of liquid in the tanks in a manner which will be presently described.

The reed switches 58, 60, 62, 64 are mounted adjacent to scales 66, 68 which are calibrated in units of volume. Each of the scales 66, 68 may have a plurality of sets of scale divisions marked thereon for the purpose of accommodating liquids of different density or changes in density of a single fluid due to changes in operating temperature.

The description of the liquid level control device 48 according to U.S. Pat. No. 3,703,246 has been described by way of example only and it is understood that any one of a number of liquid level control devices which provide or modify an electrical signal responsive to a change in the liquid level in a tank may be incorporated in the static metering pump 10.

Each of the tanks 12, 14 also include a respective emergency sensor switch 70, 72 disposed above the highest position of the reed switches 58, 62 for the purpose of providing an emergency signal in the event of a malfunction of the reed switches 58, 62, in order to prevent unwanted overfilling of the tanks 12, 14.

The static metering pump 10 includes a control panel 74 having the following switches and controls: counter-preset and control 76, on-off switch 78, first filling switch 80, start switch 82, first emergency switch 84 and second emergency switch 86. The control panel 74 and the various components of the static metering pump 10 are connected via a plurality of electrical leads 88 which will be individually described in the following description of operation.

The metering operation is accomplished by alternate and successive emptying of the tanks 12 and 14, with one tank filling while the other is emptying. Because of the pre-set positions of the upper reed switches 58, 62 and lower reed switches 60, 64, each tank is adapted to dispense an exact volume of fluid, for example ten gallons. The upper reed switches 58 and 62 serve as sensors for the full level of fluid in the respective tanks 12 and 14, while the lower reed switches 60 and 64 serve as sensors for the empty level of fluid in the tanks, that is the level at the end of the tank discharge. Between the full level sensors 58,62 and the empty level sensors 60,64 are the designated fluid volumes to be dispensed, for example, ten gallons. Thus with each discharge cycle of each the tanks 12 and 14, a precise volume of ten gallons is dispensed.

The total volume of liquid to be dispensed is set by the operator on the counter-preset and control 76 on control panel 74, for example a total volume of sixty gallons may be set. The static metering pump 10 will then operate automoatically to cause alternate emptying of the tanks 12 and 14 six times, so that exactly sixty gallons of liquid are metered.

Figure 2:
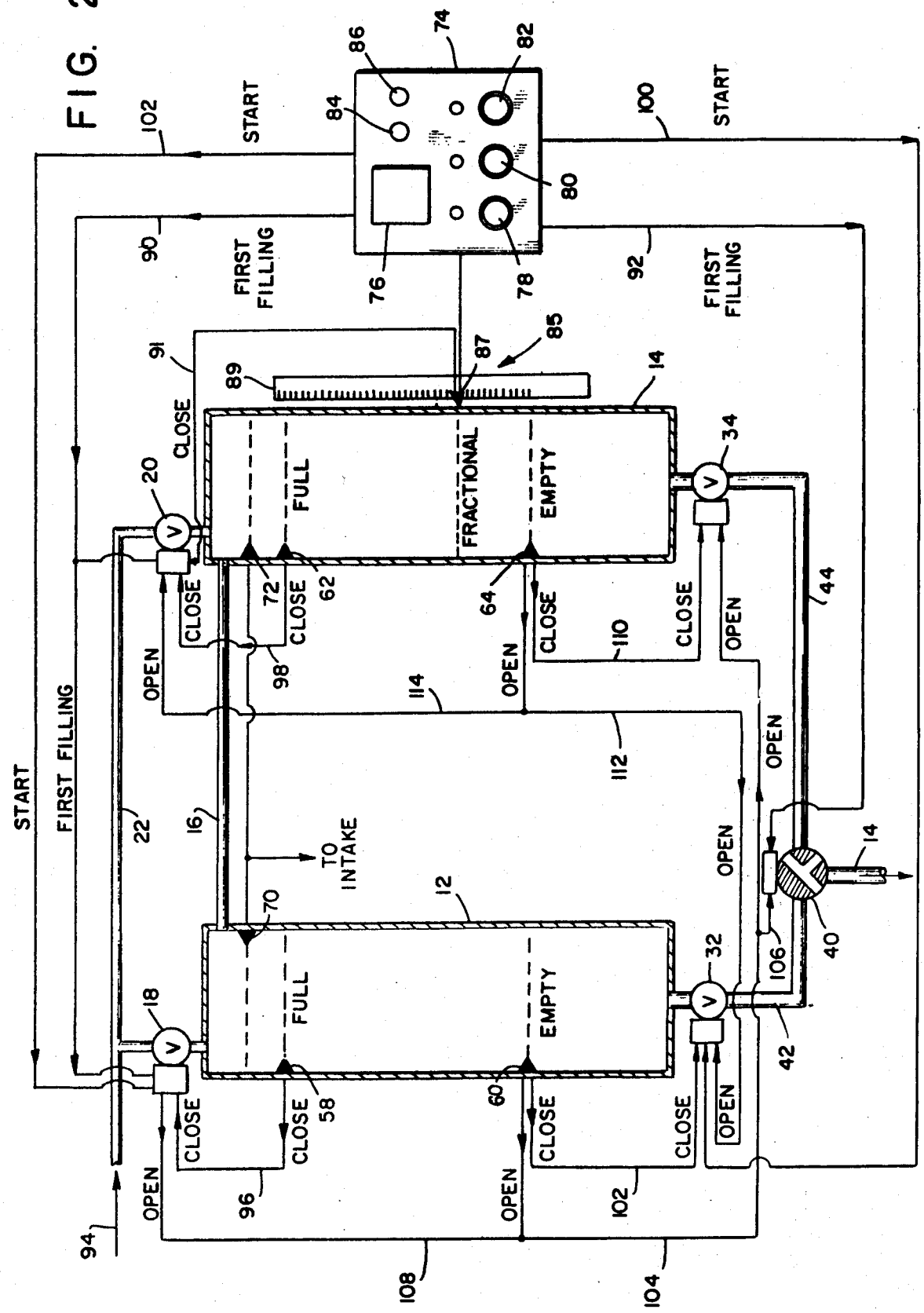
FIG. 2 is a schematic functional diagram of the static pump of FIG. 1, showing the flow of electrical signals between the various components.

In order to meter a total volume of liquid which is not an exact multiple of the pre-set volumes dispensed by the tanks 12 and 14, for example sixty-four gallons, the static metering pump is provided with a fraction sensor 85, shown in FIG. 2, in the form of a magnetic reed switch 87 associated with the tank 14. The reed switch 87 is slidably mounted adjacent to scale 89 which is calibrated in fractions of the dispensing volume of tank 14. The sensor 85 may be manually set for a desired fractional volume and when the metering system is placed into operation, in the manner to be presently described, the tank 14 will be partially filled, up to the level of the fraction sensor 85, and will initially discharge its partial content. Thereafter, the tanks 12 and 14 will alternately discharge their full volumes until the desired total volume of liquid is metered.

The operation of the static metering pump 10 will now be described with reference to FIG. 2. Prior to the start of the metering operation the operator sets the desired total volume on the counter-preset and control 76 on the control panel 74. This total volume may be an even multiple of the ten gallon dispensing charge of each tank 12 and 14, for example, sixty gallons. However, if the desired total volume is not such an even multiple, for example, sixty-four gallons, the operator also sets the fractional amount, namely four gallons on the counter-present and control 76. In addition, he manually sets the sliding reed switch 87 of the fraction sensor 85 to that point on the calibrated scale 88 indicating two-fifths of the volume of tank 14, namely four gallons.

The operator now pushes on-off switch 78 to energize the system and then pushes the first filling switch 80 on the control panel 74, which initiates one of two alternative filling actions. If no fractional amount is set on the counter-present and control 76 and on the fraction sensor 85, the first filling switch 80 sends an electrical signal via lead 90 which opens the intake valves 18 and 20, and also sends via lead 92 an electrical signal which adjusts the three-way valve 40 to permit flow from tank 12 and to prevent flow from tank 14. Liquid flows from a source (not shown) through the tube 22 in the direction of the arrow 94 in FIG. 2, and fills tanks 12 and 14. When the liquid level in tanks 12 and 14 reach the level of the reed switches 58, 62, signals are sent via leads 96, 98 which close the intake valves 18, 20. The static metering pump 10 is now ready for metering operation, which will commence with the emptying of the tank 12, and will continue with alternate emptying of the tanks 12 and 14 until the desired total volume is reached. Thus, if a total metered volume of sixty gallons is called for, six discharges of the two tanks will be made.

If, on the other hand, the total volume of liquid to be dispensed includes a fraction of the capacity of the tanks, and this fractional amount is set on the counter-preset and control 76, when the operator pushes the first filling switch 80, the intake valves 18 and 20 are opened via lead 90, and an electrical signal is sent via lead 92 to adjust the three-way valve 40 to permit flow from tank 14 and prevent flow from tank 12. Liquid thus flows through tube 22 and the open intake valves 18 and 20 into tanks 12 and 14. The tank 12 is filled to its full ten gallon capacity, until the liquid level reaches the reed switch, sensor 58 and the valve 18 is then closed. The tank 14, however, is filled only to the selected fractional volume, which is determined by the liquid level reaching the reed switch 87 of the fractional sensor 85, the latter then shutting off the valve 20 via lead 91.

It will thus be seen that the pressing of the first filling switch 80 in effect "primes" the static metering pump so that both tanks 12 and 14 are filled to their desired capacities. If a fractional total volume is set, the tank 14 is filled to that fractional volume, for example four gallons, and it will be the first to discharge during the metering cycle. If, however, no fractional total volume is called for, the tank 14 will be filled to its full volume of ten gallons, and tank 12 will be the first to discharge during the metering cycle.

When the static metering pump 10 has been properly primed, a signal light (not shown) on the control panel is illuminated to advise the operator that priming is completed. The operator now pushes the start switch button 82 to commence the metering operation. If no fractional total volume has been set in the control panel 74, the start switch 82 sends an electrical signal to outlet valve 32 via lead 100, this signal opening the outlet valve 32. Liquid starts to flow from tank 12 through the tube 42, the three-way valve 40 and the tube 46. When the liquid level in tank 12 reaches the level of the reed switch 60, a signal is sent via lead 102 which closes the valve 32, a signal is sent via lead 104 which opens valve 34, a signal is sent via lead 106 which causes the three-way valve 40 to change position to permit flow from tank 14 and to prevent flow from tank 12, and a signal is sent via lead 108 opening intake valve 18.

Liquid now starts to flow from tank 14 while tank 12 is being refilled. When the liquid level in tank 14 reaches the level of the reed switch sensor 64, a signal is sent via lead 110 which closes the valve 34, a signal is sent via a lead 112 which opens valve 32, a signal is sent via the leads 104 and 106 which causes the three-way valve 40 to change position to permit flow from tank 12 and to prevent flow from tank 14, and a signal is sent via a lead 114 opening the intake valve 20. Liquid now starts to flow from tank 12 while tank 14 is refilled. This cycle of operation is repeated automatically until the number of cycles which has been preselected on the control panel 74 is reached, at which time the desired volume of fluid has been discharged and the counter-preset and control 76 stops the operation of the static metering pump 10.

If a fractional total volume has been set in the control panel 74, depression of the start switch button 82 will send an electrical signal to outlet valve 34 of tank 14 via lead 93, this signal opening the outlet valve 34. Liquid now flows from the tank 14 through the tube 44, the three-way valve 40 and the tube 46. When the liquid level in tank 14 reaches the level of the reed switch 64, so that dispensing of the fractional volume of four gallons is completed, a signal is sent via lead 110 which closes the valve 34, a signal is sent via lead 112, which opens valve 32, a signal is sent via a lead (not shown) which causes the three-way valve 40 to change position to permit flow from tank 12 and prevent flow from tank 14, and a signal is sent via lead 114 opening intake valve 20. Liquid now flows from tank 12 while tank 14 is being filled to its full ten gallon capacity. The tanks 12 and 14 now alternately fill and empty until the total fractional volume of metered liquid called for has been dispensed.

It will thus be appreciated that a precise metered volume of liquid will be dispensed by the static metering pump 10 by merely setting the desired volume to be dispensed (including any fractional amount) on the counter-preset and control 76. The assembly will automatically meter the desired volume by alternate filling and emptying of the tanks 12 and 14. The efficiency will automatically meter the desired volume by alternate filling and emptying of the tanks 12 and 14. The efficiency of the static metering pump is always constant, regardless of the rate of flow of the liquid which can be varied by selectively changing the replaceable orifice members 28 and 30. This precise metering of a desired volume at any selected rate of flow cannot be achieved by conventional metering pumps of the rotary or piston types which depend upon internal mechanical movement.

Figure 3:
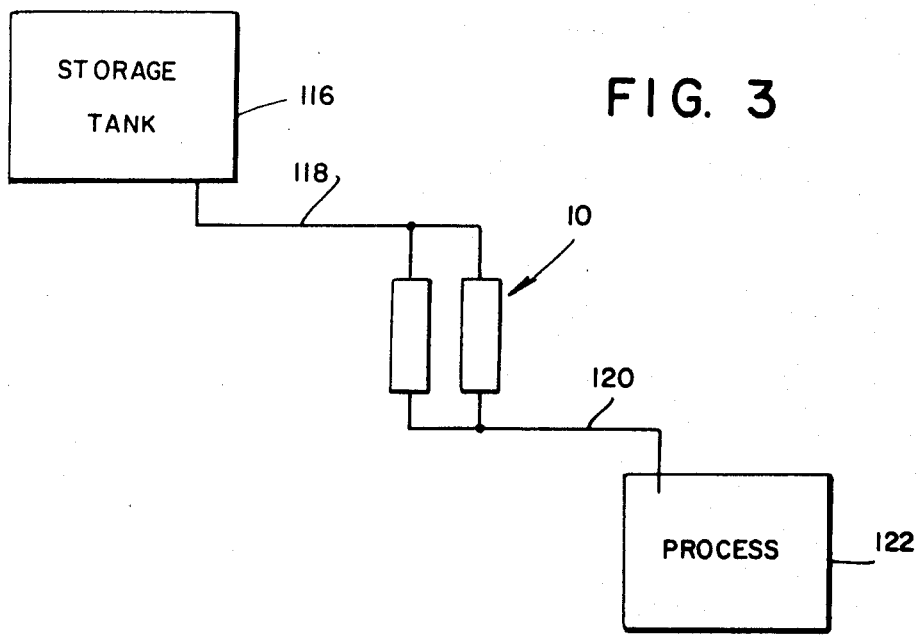
FIG. 3 is a schematic elevational view of an application of the static pump of FIG. 1, with the static pump shown using a gravity feed.
Figure 4:
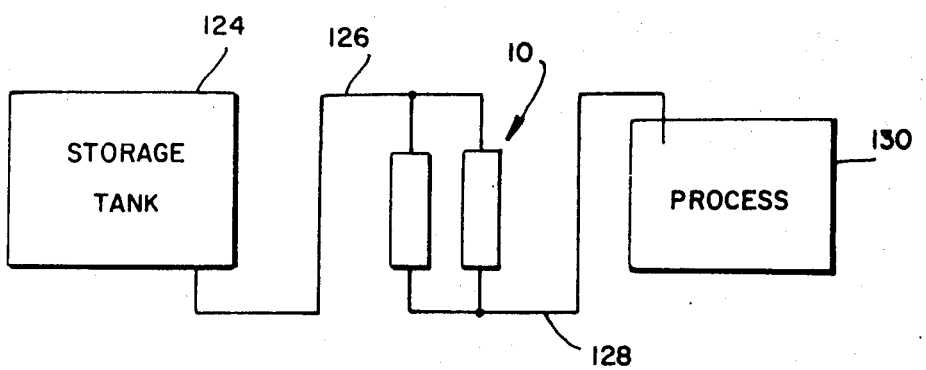
FIG. 4 is a schematic elevational view of another application of the static pump of FIG. 1, with the static pump shown being fed from a pressurized storage tank.
Figure 5:
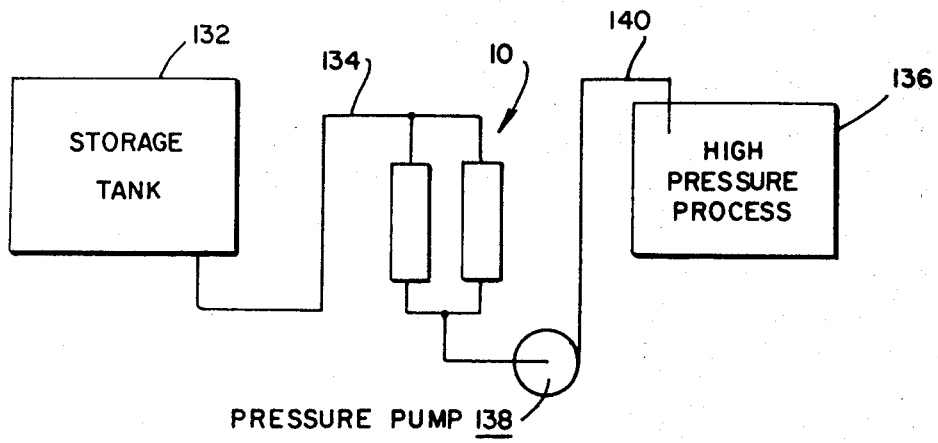
FIG. 5 is a schematic elevational view of still another application of the static pump of FIG. 1, showing the addition of a pressure pump.

Applications of the static pump 10 are shown in FIGS. 3–5. FIG. 3 shows the static pump 10 being fed by gravity from an elevated storage tank 116 via tube 118 and delivering liquid by means of gravity via tube 120 to a process which is indicated in FIG. 3 by the tank 122. FIG. 4 shows the static pump 10 being fed from an internally pressurized storage tank 124 via tube 126 and delivering liquid under pressure via tube 128 to a process which is indicated by the tank 130. FIG. 5 illustrates the static pump 10 being fed from a storage tank 132 via tube 134 and delivering liquid to a high pressure process which is indicated in FIG. 5 by the tank 136. A pressure pump 138 is connected within the pipe 140 between the static pump 10 and the tank 136 and pumps the liquid through the system into the tank 136.

Figure 6:
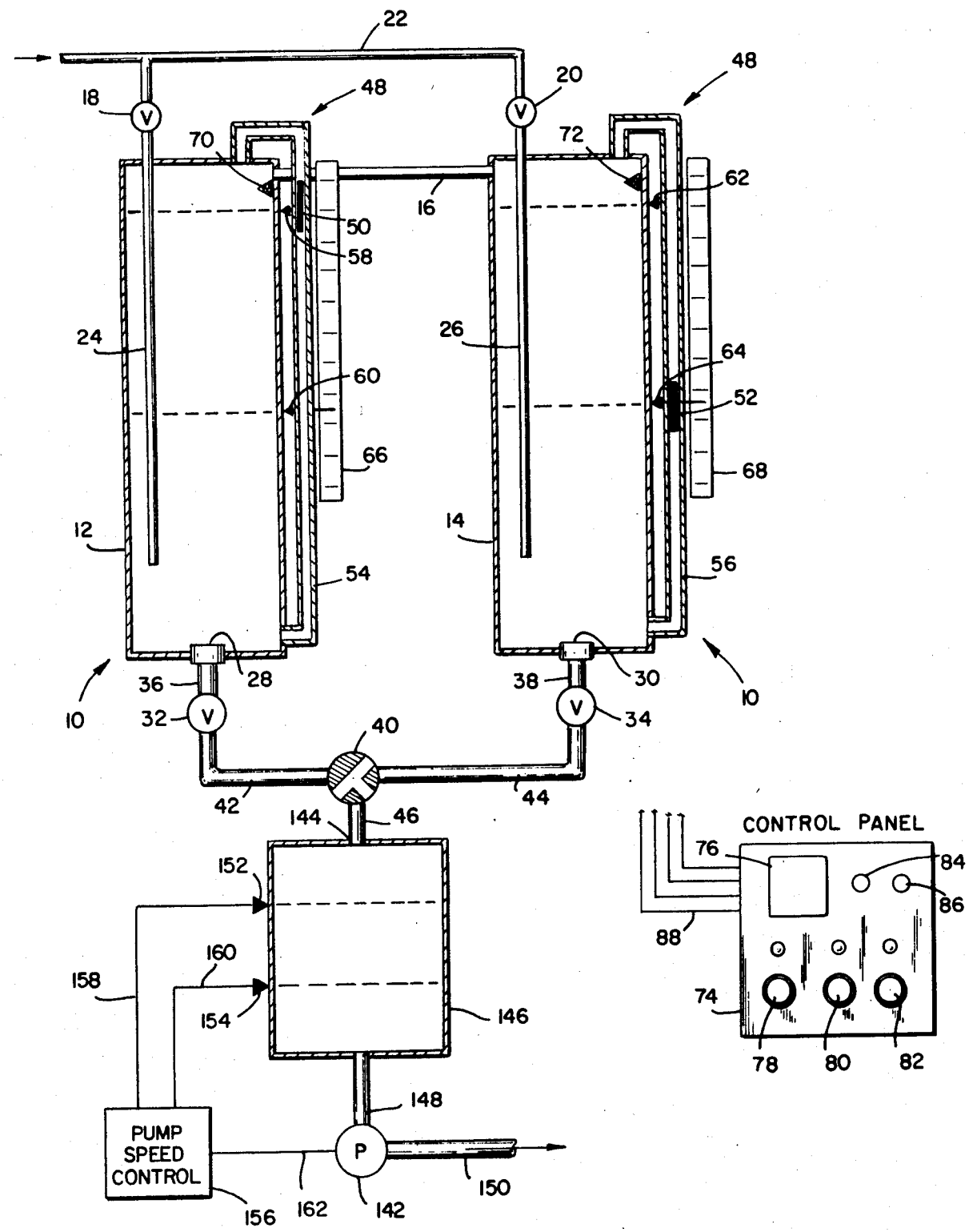
FIG. 6 is a schematic side elevational view of a second embodiment of the static pump of FIG. 1, showing the incorporation of an additional tank and a high pressure pump for the delivery of fluids under extremely high pressures.

In a second embodiment of the invention, shown in FIGS. 6 and 7, the static metering pump 10 is adapted for delivery of liquid under high pressures, which may be in the order of hundreds of pounds per square inch. This embodiment features the use of a high pressure pump 142 which pressurizes the liquid, and yet permits the static pump 10 to be designed to withstand relatively low pressures, thereby resulting in economy of construction. With reference to FIG. 6, the tube 46 leading from the three-way valve 40 is connected to the inlet 144 of a pressure tank 146. The tank 146 is connected to the high pressure pump 142 via a tube 148, and the high pressure pump 142 delivers liquid under high pressure via tube 150. The tank 146 includes a pair of liquid level sensors 152, 154 which are adjustably mounted on the tank 146 and which provide electrical signals responsive to the liquid level within the tank 146, in cooperation with a magentic float of the type shown in FIGS. 1 and 6.

A pump speed control unit 156 is connected to the liquid level sensors 152, 154 via leads 158, 160 and to the high pressure pump 142 via lead 162. If the high pressure pump 142 shows down for any reason, such as through a quite common drop in the external line voltage being supplied to the pump input power line 162, the liquid level in the tank 146 will rise. When the liquid level reaches the level of the liquid level sensor 152, a signal is sent to the pump speed control via the lead 158 to increase the speed of the pump 142, so that the pump 142 withdraws liquid from the tank 146 at an increased flow rate. When the liquid level reaches the level of the liquid level sensor 154, a signal is sent to pump speed control 156 via the lead 160 to decrease the speed of the pump 142. The positions of the liquid level sensors are adjustable and may be selectively set so that the changes in the flow rate of the outgoing liquid in the tube 150 is negligible. This arrangement for speed control of the pump 142 prevents fluctuations in the input power voltage delivered to the pressure pump from causing problems such as temporary overspeeding of the pressure pump 142 resulting in the pressure pump 142 pumping at a rate faster than the static pump 10 can deliver, and causing starving of the pressure pump 142.

The speed control described above also compensates for temporary underspeed of pressure pump 142, which underspeed would ordinarily result in the pressure pump's failure to accept all of the liquid delivered by the static pump 10, causing inaccuracy in the metering process.

While preferred embodiments of the invention have been shown and described herein, it is obvious that numerous omissions, changes and additions may be made in such embodiments without departing from the spirit and scope of the invention.

What is claimed is:

1. A static metering pump comprising a pair of tanks, tube means connecting said tanks at the upper portions thereof for equalization of pressure within said tanks, a pair of electrically-operated intake valves disposed, one each, at upper portions of said tanks, a pair of electrically-operated outlet valves disposed, one each, at lower portions of said tanks, respective outlet tubes communicating with the outlet valves of each of said tanks and communicating with a common discharge tube, upper and lower liquid sensor means disposed on each of said tanks for sensing pre-set selected full levels and empty levels in said tanks, and forming therebetween a normal pre-set liquid cavity of equal volume in each of said tanks, said cavities being sized to contain a normal pre-set volume of liquid, circuit connection means interconnecting said inlet valves, said outlet valves and said upper and lower liquid level sensor means, with said upper and lower liquid level sensor means and said circuit connection means being adapted to open and close said valves in order to permit filling said first tank from an external source of liquid while discharging liquid from said second tank and then permitting discharging liquid from said first tank while filling said second tank, electrically-operated control means for permitting a preselected number of tank filling and discharge cycles to be performed automatically until a total selected volume of liquid is dispensed from both tanks, representing a multiple of said normal pre-set volumes, after which operation of said static metering pump is stopped, thereby permitting the dispensing of a preselected volume of liquid, and an adjustable fractional liquid level sensor disposed on one of said tanks intermediate said upper and lower liquid sensors for sensing a selected fractional filled level for said one tank at the commencement of the metering operation, said control means being adapted to commence the metering cycles by the discharge of said one tank.

2. A static metering pump according to claim 1 in which said adjustable liquid level sensor is mounted for selected vertical movement relative to said one tank and is associated with a scale calibrated in units of fractions of the full capacity of said one tank, whereby said adjustable liquid sensor may be set at a selected fraction of said tank capacity.

3. A static metering pump according to claim 1 which further includes a gas inlet mounted on an upper portion of said first tank for introducing gas under pressure above the level of liquid in said tank.

4. A static metering pump according to claim 1 which further includes a third tank communicating with said outlet tube, a high level liquid sensor and a low level liquid sensor mounted on said third tank, an outlet tube communicating with said third tank, a pressure pump mounted on said outlet tube, pump speed control means connected to said pressure pump and to said high level liquid sensor and said low level liquid sensor with said pump speed control adapted for increasing the speed of the pump responsive to the level of liquid in said third tank rising above said high level sensor and decreasing the speed of said pump responsive to the level of liquid in said third tank falling below said low level sensor.

5. A static metering pump according to claim 1 in which each of said tanks has a replaceable outlet orifice communicating with said outlet valve.

6. A static metering pump according to claim 1 in which said liquid level sensor means includes a high level sensor and a low level sensor mounted on each of said tanks.

7. A static metering pump according to claim 6 in which an emergency sensor switch is associated with each of said tanks and disposed above said high level sensor, said emergency sensor switch being adapted to provide an emergency warning signal in the event of malfunction of said high level sensor, whereby to prevent overfilling of said tank.

8. A static metering pump according to claim 1 in which said liquid level sensor means comprises a magnetic float associated with each of said tanks with each float arranged to follow the level of liquid in its respective tank, and a pair of reed switches mounted adjacent each of said tanks, one reed switch of each pair being mounted in registry with said selected full level of the respective tank, and the other reed switch of each pair being mounted adjacent said selected empty level of said tank.

9. A static metering pump according to claim 8 in which said reed switches are mounted for adjustable vertical movement relative to said tanks, whereby said selected full level and empty level of each tank may be selectively varied.

10. A static metering pump according to claim 8 in which each of said tanks has an external vertical tube associated therewith and communicating with the upper and lower portions of said tank, whereby liquid within said vertical tube is at the same level as the liquid in the respective tank, each of said magnetic floats being contained within a vertical tube and resting on the surface of the liquid therein, said reed switches being mounted adjacent said vertical tube.

* * * * *